United States Patent [19]

Kitamura

[11] Patent Number: 4,774,450
[45] Date of Patent: Sep. 27, 1988

[54] STABILIZED POWER-SUPPLY CIRCUIT CONNECTABLE WITH AUXILIARY ELECTRIC SOURCE WITHOUT AN INTERMEDIARY BLOCKING DIODE

[75] Inventor: Masahiro Kitamura, Tokyo, Japan
[73] Assignee: NEC Corporation, Japan
[21] Appl. No.: 8,187
[22] Filed: Jan. 28, 1987
[30] Foreign Application Priority Data Jan. 28, 1986 [JP] Japan .................................. 61-17161

[51] Int. Cl.$^4$ ............................................. G05F 1/56
[52] U.S. Cl. .................................... 323/285; 323/284; 307/66
[58] Field of Search ....................... 323/282, 284, 285; 307/64, 66

[56] References Cited
U.S. PATENT DOCUMENTS

| 3,809,999 | 5/1974 | Smith | 323/285 |
| 4,388,706 | 6/1983 | Butler | 307/64 X |
| 4,400,625 | 8/1983 | Hussey | 307/66 |
| 4,564,767 | 1/1986 | Charych | 307/66 |
| 4,677,311 | 6/1987 | Morita | 307/64 X |

FOREIGN PATENT DOCUMENTS 1121659 10/1984 U.S.S.R. ............................... 323/282

Primary Examiner—Patrick R. Salce
Assistant Examiner—Marc S. Hoff
Attorney, Agent, or Firm—Laff, Whitesel, Conte & Saret

[57] ABSTRACT

A stabilized power-supply circuit comprising an input terminal to be connected to an electric power source, and an output terminal to be connected to a load and an auxiliary power source. An error signal generator is provided to receive a reference voltage at its one input, and a drive circuit is connected to an output of the error signal generator. Further, an output circuit is connected between the input terminal and the output terminal and driven by the drive circuit so as to supply a controlled voltage to the output terminal, and a feedback circuit is connected at its one end to the output terminal and at its other end to the other input of the error signal generator. In this power-supply circuit, there is provided a circuit for monitoring the voltage on the output terminal so as to bring the output circuit in a cut-off condition when the output terminal voltage drops.

19 Claims, 2 Drawing Sheets

STABILIZED POWER-SUPPLY CIRCUIT CONNECTABLE WITH AUXILIARY ELECTRIC SOURCE WITHOUT AN INTERMEDIARY BLOCKING DIODE

BACKGROUND OF THE INVENTION

1. Field of the Invention

The present invention relates to a stablized power-supply circuit, and more specifically to a stabilized power-supply circuit which is supplied with electric power from an external power source and to supply a stabilized voltage to a load having an auxiliary power source.

2. Description of Related Art

Stabilized power-supply circuits have been widely used for supplying a stable electric voltage to electronic devices such as microcomputers, semiconductor memories, etc. When the output voltage supplied from the stabilized power-supply circuits accidentally drops, the microcomputers and semiconductor memories are often inadvertently cancelled or lost, and information stored in memories is garbled in some cases. For avoiding such troubles, an auxiliary electric source is ordinarily connected in parallel with a load such as a microcomputer and a memory, so that the auxiliary electric source will supply the necessary electric power to the load when the voltage of a main power source drops. But, the auxiliary electric source generally has only a relatively small capacity, and therefore, in order to make it possible for the auxiliary electric source to supply a necessary voltage to the load for as long a time as possible, it is necessary to prevent an electric current from flowing to the stabilized power-supply circuit from the auxiliary electric source. If a blocking diode is provided for this purpose, the voltage actually supplied from the stabilized power-supply circuit to the load is lowered by a forward voltage drop of the diode in a normal operation. Therefore, the of such a blocking diode is not suitable because of a restriction of effective utilization of the main power source in as wide a voltage range as possible.

SUMMARY OF THE INVENTION

Accordingly, it is an object of the present invention to provide a stabilized power-supply circuit.

Another object of the present invention is to provide a stabilized power-supply circuit which needs no blocking diode so that the voltage of an associated main power source can be effectively utilized in a maximum possible range.

Still another object of the present invention is to provide a stabilized power-supply circuit which can prevent, without blocking diode, a reverse current flowing from an auxiliary electric source to the stabilized power supply when the output voltage drops.

The above and other objects of the present invention are achieved in accordance with the present invention by a stabilized power-supply circuit comprising an input terminal to be connected to an electric power source, an output terminal to be connected to a load and an auxiliary power source, an error signal generator adapted to receive a reference voltage at its one input, a drive circuit connected to an output of the error signal generator, an output circuit connected between the input terminal and the output terminal and driven by the drive circuit so as to supply a controlled voltage to the output terminal, a feedback circuit connected at its one end to the output terminal and at its other end to the other input of the error signal generator, and mean for monitoring the voltage on the output terminal so as to bring the output circuit into a cut-off condition when the output terminal voltage drops.

For the purpose of bringing the output circuit into the cut-off condition, the monitor means may be adapted to put the feedback circuit into a cut-off condition when the output terminal voltage drops. Alternatively, the monitor means can be adapted to put at least one of the error signal generator and the drive circuit into an inoperable condition when the output terminal voltage drops.

More preferably, the monitor means is adapted to put the feedback circuit in a cut-off condition and also to put the error signal generator and the drive circuit in an inoperable condition when the output terminal voltage drops.

In a preferred embodiment, the monitor means includes a comparator having a first input connected to the input terminal and a second input connected to the output terminal. This comparator operates to maintain the output circuit in an operable condition when the voltage at the input terminal is not smaller than the voltage at the output terminal and to put the output circuit into a cut-off condition when the input terminal voltage becomes smaller than the output terminal voltage.

Specifically, the drive circuit is associated with a first analog switch which is controlled by the output of the comparator to selectively maintain the drive circuit in an operable condition when the input terminal voltage is not smaller than the output terminal voltage and in a cut-off condition when the input terminal voltage becomes smaller than the output terminal voltage.

Furthermore, the feedback circuit is associated with a second analog switch which is controlled by the output of the comparator to selectively maintain the feedback circuit in a signal transmissible condition when the input terminal voltage is not smaller than the output terminal voltage and in a cut-off condition when the input terminal voltage becomes smaller than the output terminal voltage.

In addition, the error signal generator is associated with a third analog switch which is controlled by the output of the comparator to selectively maintain the error signal generator when the input terminal voltage is not smaller than the output terminal voltage and in a cut-off condition when the input terminal voltage becomes smaller than the output terminal voltage.

According to a second aspect of the present invention, a power-supply circuit comprises a voltage input terminal, a voltage output terminal, a feedback circuit connected to the voltage output terminal for generating a feedback voltage, means for comparing the feedback voltage with a reference voltage for generating an error signal, an output circuit connected between the voltage input terminal and the voltage output terminal for supplying a stabilized voltage to the voltage output terminal in response to the error signal, means for comparing the voltage at the voltage input terminal with the voltage at the voltage output terminal for generating an output signal when the former voltage is lower than the latter voltage, means provided between the voltage output terminal and the feedback circuit and responsive to the output signal to separate the feedback circuit from the voltage output terminal, and means coupled to the output circuit and responsive to the output signal to put the output circuit in an inoperable condition.

Furthermore, according to a third aspect of the present invention, a stabilized power-supply circuit includes a reference voltage circuit for generating a reference voltage, a voltage input terminal, a voltage output terminal, a feedback circuit having a resistor connected to the voltage output terminal for generating a feedback voltage, means comparing the feedback voltage with the reference voltage for generating an error signal, a drive circuit receiving the error signal, an output circuit connected between the voltage input terminal and the voltage output terminal and driven by the drive circuit to supply a stabilized voltage to the voltage output terminal, wherein the improvement comprises a first switch circuit connected between the voltage output terminal and the feedback circuit, a second switch circuit connected to the error signal generating means, a third switch circuit connected to the drive circuit, and a comparator means connected between the voltage input terminal and the voltage output terminal and having an output connected to respective control inputs of the first, second and third switch circuits.

According to a fourth aspect of the present invention, a stabilized power-supply circuit comprises:

an input terminal adapted to be connected to an electric power source, an output terminal adapted to be connected to a load and an auxiliary power source, a ground terminal, a reference voltage circuit for generating a reference voltage, a differential circuit having one input adapted to be connected to the reference voltage circuit and another input connected to receive a voltage signal representative of the voltage at the output terminal, the differential circuit being connected to the ground terminal through a first analog switch so that when the first analog switch is maintained in ON condition the differential circuit is held in an operable condition, and when the second analog switch is turned off the differential amplifier is rendered inoperable, a drive circuit including a NPN drive transistor connected at its emitter to the ground terminal and at its base to the output of the differential circuit, and a second analog switch connected between the base of the drive transistor and the ground terminal to bring the drive transistor into a cut-off condition when the second analog switch is closed, a PNP output transistor connected at its base to a collector of the drive transistor, an emitter and a collector of the output transistor being connected to the input terminal and the output terminal, respectively, a feedback circuit including a resister connected at one end to the second input of the differential circuit and a third analog switch connected between the other end of the resistor and the output terminal, a comparator which includes a first input PNP transistor connected at its emitter to the input terminal and at its collector to respective control inputs of the first and third analog switches and through a diode to the ground terminal, a second input PNP transistor connected at its emitter to the output terminal and at its collector through a first constant current circuit to the ground terminal, and a third PNP transistor connected at its base to the collector of the second input transistor and at its collector to a control input of the second analog switch and through a second constant current circuit to the ground terminal, the bases of the first and second input transistors being connected together through a third constant current circuit to the ground terminal and also through another diode to the input terminal, whereby when the voltage at the input terminal is higher than the voltage at the output terminal, the first input transistor is maintained in an ON condition and the second input transistor is in OFF condition to put the third transistor into an ON condition thereby bringing the first to third analog switches into an ON condition, and when the voltage at the output terminal is higher than the voltage at the input terminal, the first input transistor is brought into an OFF condition and the second input transistor is brought into an ON condition to put the third transistor in an OFF condition thereby bringing the first to third analog switches into an OFF condition.

The above and other objects, features and advantages of the present invention will be apparent from the following description of preferred embodiments of the invention with reference to the accompanying drawings.

DESCRIPTION OF THE PREFERRED EMBODIMENTS

Figure 1:
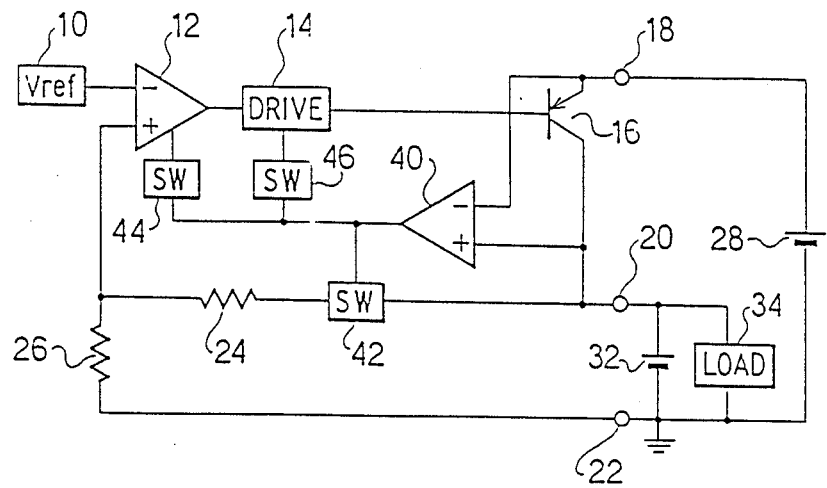
FIG. 1 is a circuit diagram of one embodiment of the stabilized power-supply circuit in accordance with the present invention.

Referring to FIG. 1, there is shown a stabilized power-supply circuit in accordance with the present invention, which includes a reference voltage circuit 10 connected to an inverting input of an error signal generator 12. This error signal generator 12 has an output connected through a drive circuit 14 to a base of an output PNP transistor 16. An emitter of the transistor 16 is connected to an input terminal 18. A collector of the transistor 16 is connected to an output terminal 20, which is connected to a ground terminal 22 through a two series-connected resistors 24 and 26 functioning as a voltage divider. A connection node between the resistors 24 and 26 is connected to another input, i.e., a input of the error signal generator 12.

In use, the input terminal 18 is connected to a positive terminal of a main power source 28, and the output terminal 20 is connected to a positive terminal of an auxiliary power source 32 and one end of a load 34. The ground terminal 22 is connected to negative terminals of the main and auxiliary power sources 28 and 32 and the other end of the load 34. Further, the embodiment comprises a comparator 40 having one input connected to the input terminal 18 and the other input connected to the output terminal 20. An output of the comparator 40 is connected to a control input of an analog switch 42 inserted between the output terminal 20 and the resistor 24. Further, the output of the comparator 40 is connected to control inputs of analog switches 44 and 46 associated with the error signal generator 12 and the drive circuit 14, respectively.

The comparator 40 is adapted to control the analog switches 42, 44 and 46 in the following manner. When the voltage at the input terminal 18 is not smaller than the voltage at the output terminal 20, the comparator 40 operates to maintain the switches 42 and 44 an ON condition and the switch 46 in an OFF condition so that the error signal generator 12 and the drive circuit 14 are held in an operable condition. On the other hand, when the voltage at the input terminal 18 becomes smaller than the voltage at the output terminal 20, the comparator 40 operates to turn off the switches 42 and 44 and to turn on the switch 46 so that the error signal generator 12 and the drive circuit 14 are put in an inoperable condition.

Next, an explanation will be made of the operation of the stabilized power-supply circuit shown in FIG. 1.

If the voltage at the input terminal 18 is not smaller than the voltage at the output terminal 20, as mentioned above the switch 42 is maintained ON by the comparator 40, and the error signal generator 12 and the drive circuit 14 are held in an operable condition through the associated switches 44 and 46 by the comparator 40. Therefore, the voltage at the output terminal 20 is fed through the switch 42 to the voltage divider consisting of the resistors 24 and 26. A voltage in proportion to the voltage of the output terminal 20 is inputted to the non-inverting input of the error signal generator 12, where it is compared with a reference voltage $V_{ref}$ supplied from the reference voltage circuit 10. As a result, a voltage difference is outputted from the error signal generator 12 and applied through the drive circuit 14 to the base of the output transistor 16. Thus, the transistor 16 is put in a conductive condition in accordance with the base biasing voltage, so that the voltage of the main power source 28 is adjusted by the output transistor 16 and the adjusted voltage will be supplied to the output terminal 20. The voltage of the output terminal 20 is directly supplied to the load 34 without a substantial voltage drop, since no diode is inserted between the output terminal 20 and the load 34. Thus, the voltage of the main power source 28 can be utilized in a maximum voltage range.

On the other hand, if the voltage at the input terminal 18 becomes smaller than the voltage at the output terminal 20, it is detected by the comparator 40, so that the switches 42 and 44 are brought into an OFF condition and the switch 46 is brought into an ON condition. Thus, the feedback path between the output terminal 20 and the non-inverting input of the error signal generator 12 is broken by a turn-off of the switch 42. Furthermore, the error signal generator 12 and the drive circuit 14 are put in the inoperable condition by the turn-on and turn-off of the respective switches 44 and 46. As a result, the output transistor 16 is put in a cut-off condition.

In this condition, since the PNP transistor 16 is not supplied with a base driving current, the transistor 16 is prevented from functioning as a reverse transistor which would be caused by the reversal of the voltage relation between the main power source 28 and the auxiliary power source 32. Accordingly, a reverse current from the auxiliary power source 32 to the stabilized power-supply circuit is substantially prevented without a blocking diode having to be connected between the output terminal 20 and the auxiliary power source 32. Only the reverse current is a very small current inputted to the comparator 40. In general, the input current of the comparator is in the order of a few microamperes or less. On the other hand, the load current is in the order of a few hundreds microamperes or more. Therefore, the auxiliary power source 32 can supply a necessary voltage to the load 34 for a sufficiently long time.

Figure 2:
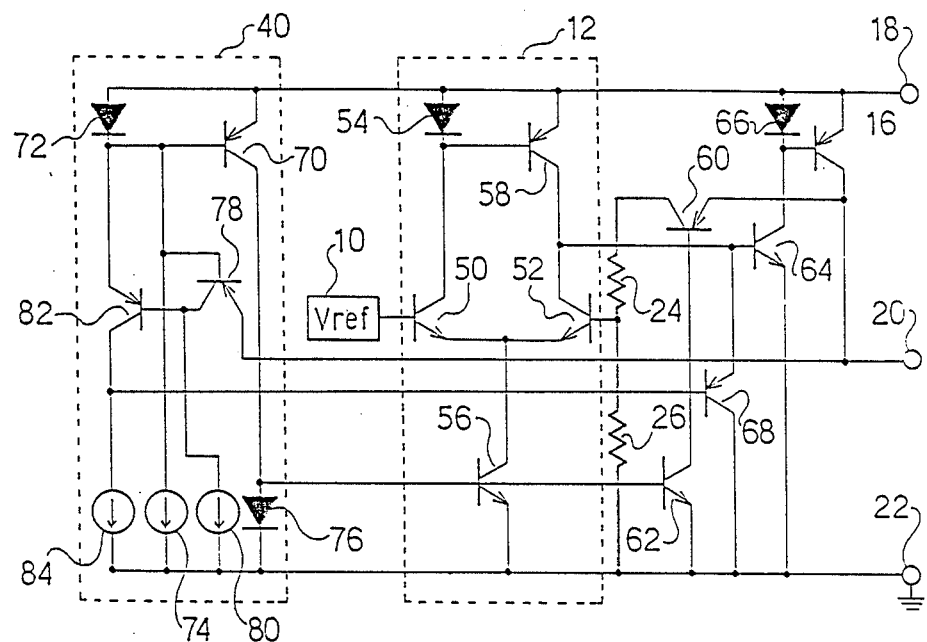
FIG. 2 is a detailed circuit diagram of the stabilized power-supply circuit shown in FIG. 1.

FIG. 2 shows a detailed circuit diagram of the circuit shown in FIG. 1. In FIG. 2, elements corresponding to those shown in FIG. 1 are given the same Reference Numerals.

As shown in FIG. 2, the error signal generator 12 includes a pair of NPN transistors 50 and 52 connected in a differential circuit configuration. One of these transistors 50 is connected at its base to the reference voltage circuit 10. A collector of the NPN transistor 50 is connected to a cathode of a diode 54, whose anode is connected to the input terminal 18. An emitter of the NPN transistor 50 is connected to an emitter of the other NPN transistor 52 and a collector of a NPN transistor 56, which is connected at its emitter to the ground terminal 22. A collector of the NPN transistor 52 is connected to a collector of a PNP transistor 58, which has an emitter connected to the input terminal 18 and a base connected to a connection node between the diode 54 and the collector of the NPN transistor 50. A connection node between the collector of the NPN transistor 52 and the collector of the PNP transistor 58 constitutes an output of the differential circuit. The base of the NPN transistor 52 constitutes a second input of the differential circuit. With this arrangement, if the NPN transistor 56 is put in a conductive condition, the differential circuit is operable. But, if the NPN transistor 56 is turned off, the differential circuit becomes inoperable. Therefore, the NPN transistor 56 functions as the switch 44 shown in FIG. 1.

The second input of the differential circuit 12, i.e., the base of the NPN transistor 52 is connected through the resistor 26 to the ground terminal 22 and through the resistor 24 to a collector of a PNP transistor 60, whose emitter is connected to the output terminal 20. A base of the PNP transistor 60 is connected to a collector of a NPN transistor 62, which is in turn connected at its emitter to the ground terminal 22. Now, if the NPN transistor 62 is ON, the PNP transistor 60 is maintained in a conductive condition, and if the NPN transistor 62 is brought into OFF condition, the PNP transistor 60 is turned off. Therefore, the PNP transistor 60 acts as the switch 42 shown in FIG. 1.

The output of the differential circuit 12, i.e., the collector of the NPN transistor 52 is connected to a base of a NPN transistor 64, which functions as the drive circuit 14. A collector of the NPN transistor 64 is connected to a base of the output PNP transistor 16 and a cathode of a diode 66. An anode of the diode 66 and the emitter of the output PNP transistor 16 are connected to the input terminal 18, and the collector of the transistor 16 is connected to the output terminal 20. An emitter of the drive NPN transistor 64 is connected to the ground terminal. Further, there is provided a PNP transistor 68 connected at its emitter to the base of the drive NPN transistor 64 and at its collector to the ground terminal 22. Assuming that the PNP transistor 68 is in OFF condition, the collector voltage of the transistor 52 is applied to the base of the drive NPN transistor 64. But, if the PNP transistor 68 is put in an ON condition, the drive NPN transistor 64 is cut off. Therefore, the transistor 68 functions as the switch 46 as shown in Figure 1.

The comparator 40 includes an input PNP transistor 70, whose emitter is connected to the input terminal 18. A base of the PNP transistor 70 is connected to a cathode of a diode 72 which is connected at its anode to the input terminal 18. Further, the base of the PNP transistor 70 is connected through a constant current circuit 74 to the ground terminal 22. A collector of the PNP transistor 70 is connected to bases of the NPN transistors 56 and 62 and an anode of a diode 76. A cathode of this diode 76 is connected to the ground terminal 22. Further, another input PNP transistor 78 is connected at its emitter to the output terminal 20 and at its base to the base of the first input PNP transistor 70. A collector of the second input PNP transistor 78 is connected through a constant current source 80 to the ground terminal 22 and also connected to a base of a PNP transistor 82. This PNP transistor 82 is connected at its emitter to the cathode of the diode 72 and at its collector through a constant current source 84 to the ground terminal 22.

In the above mentioned circuit, if the voltage at the input terminal 18 is higher than the voltage at the output terminal 20, the base of the PNP transistor 70 is biased in a forward direction, but the base of the PNP transistor 78 is biased in a reverse direction. Therefore, the transistor 70 is maintained in an ON condition, so that a base biasing voltage is applied to the transistors 56 and 62 to maintain these transistors in an ON condition. Accordingly, the differential amplifier 12 is held in an operable condition, and the analog switch transistor 60 is kept in an ON condition. On the other hand, since the transistor 78 is put in an OFF condition, the PNP transistor 82 is biased in an the forward direction by the constant current circuit 80 so that it is put in ON condition. Therefore, a current flowing through the constant current circuit 84 is supplied from the transistor 82, with the result that the transistor 68 is not appropriately base-biased. Namely, the transistor 68 is maintained in an OFF condition. Thus, the differential circuit 12, the drive transistor 64, the output transistor 16 and the feedback path including the resistors 24 and 26 and the analog switch transistor 60 will operate in a normal condition.

But, if the voltage at the output terminal 20 becomes higher than voltage at the input terminal 18, the PNP transistor 70 is base-biased in a reverse direction so that it is turned off. The PNP transistor 78 is base-biased in a forward direction so that it is turned on. Therefore, the transistors 56 and 62 are brought into an OFF condition. As a result, the differential circuit is rendered inoperable. The analog switch transistor 60 is put in an open condition. On the other hand, since the transistor 78 is turned on, a current flowing through the constant current circuit 80 is supplied from the transistor 78, so that the transistor 82 is turned off. Therefore, the transistor 68 is biased in a forward direction by the constant current source 84 so that it is turned on. As a result, the drive transistor 64 is put in a cut-off condition. Thus, the circuit excluding the comparator 40 becomes inoperable.

Figure 3:
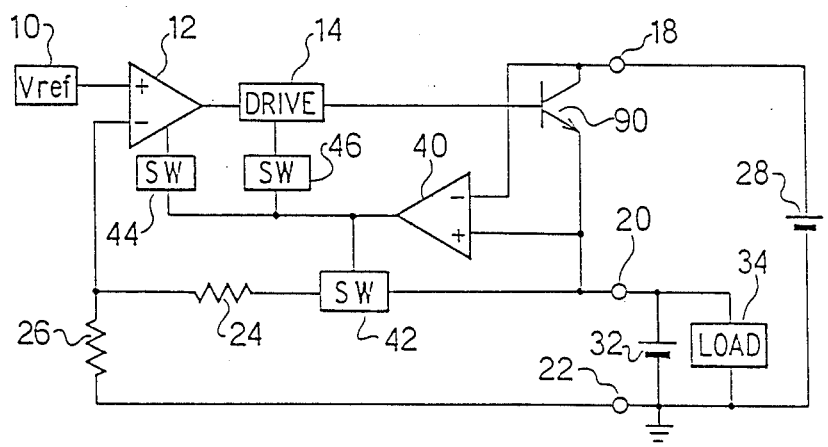
FIG. 3 is a circuit diagram of a modification of the stabilized power-supply circuit shown in FIG. 1.

FIG. 3 shows a modification of the stabilized power-supply circuit shown in FIG. 1. In the circuit shown in FIG. 3, a NPN output transistor 90 is used in place of the PNP output transistor 16. The NPN output transistor 90 is connected at its collector to the input terminal 18 and at its emitter to the output terminal 20. In this case, the error signal generator 12 is connected at its non-inverting input to the reference voltage circuit 10 and at its inverting input to the connection node between the resistors 24 and 26.

The invention has thus been shown and described with reference to specific embodiments. However, it should be noted that the invention is in no way limited to the details of the illustrated structures but changes and modifications may be made within the scope of the appended claims.

I claim:

1. A stabilized power-supply circuit comprising an input terminal to be connected to an electric power source, an output terminal to be connected to a load and an auxiliary power source, an error signal generator adapted to receive a reference voltage at its one input and at its other input a voltage which is representative of a voltage on the output terminal, a drive circuit connected to an output of the error signal generator, an output circuit connected between the input terminal and the output terminal and driven by the drive circuit so as to supply a controlled voltage to the output terminal, a feedback circuit connected at its one end to the output terminal and at its other end to the other input of the error signal generator, means for monitoring the voltage on the output terminal so as to bring the output circuit into an off condition which electrically isolates the input terminal from the output terminal when the output terminal voltage drops, wherein the monitor means includes a comparator having a first input connected to the input terminal and a second input connected to the output terminal, the comparator maintaining the output circuit in an operable condition when the voltage at the input terminal is not smaller than the voltage at the output terminal and to put the output circuit in an off condition when the input terminal voltage becomes smaller than the output terminal voltage.

2. A stabilized power-supply circuit claimed in claim 1, wherein the monitor means is adapted to put the feedback circuit in an off condition when the output terminal voltage drops.

3. A stabilized power-supply circuit claimed in claim 1 wherein the monitor means is adapted to put at least one of the error signal generator and the drive circuit in an inoperable condition when the output terminal voltage drops.

4. A stabilized power-supply circuit claimed in claim 1 wherein the monitor means is adapted to put the feedback circuit in an off condition and also to put the error signal generator and the drive circuit in an inoperable condition when the output terminal voltage drops.

5. A stabilized power-supply circuit claimed in claim 1 wherein the drive circuit includes a first analog switch which is controlled by the output of the comparator to selectively maintain the drive circuit in an operable condition when the input terminal voltage is not smaller than the output terminal voltage and in an off condition when the input terminal voltage becomes smaller than the output terminal voltage.

6. A stabilized power-supply-circuit claimed in claim 5 wherein the feedback circuit includes a second analog switch which is controlled by the output of the comparator to selectively maintain the feedback circuit in a signal transmissible condition when the input terminal voltage is not smaller than the output terminal voltage and in an off condition when the input terminal voltage becomes smaller than the output terminal voltage.

7. A stabilized power-supply circuit claimed in claim 6 wherein the error signal generator includes a third analog switch which is controlled by the output of the comparator to selectively maintain the error signal generator when the input terminal voltage is not smaller than the output terminal voltage and in an off condition when the input terminal voltage becomes smaller than the output terminal voltage.

8. A stabilized power-supply circuit claimed in claim 1 wherein the output circuit includes a NPN output transistor connected at its base to the output of the drive circuit, an collector and an emitter of the output transistor being connected to the input terminal and the output terminal, respectively.

9. A stabilized power-supply circuit claimed in claim 1 wherein the output circuit includes a PNP output transistor connected at its base to the output of the drive circuit, an emitter and a collector of the output transistor being connected to the input terminal and the output terminal, respectively.

10. A stabilized power-supply circuit claimed in claim 1 wherein the output circuit includes a bipolar output transistor connected at its base to the output of the drive circuit, opposite ends of the output transistor being connected to the input terminal and the output terminal, respectively.

11. A stabilized power-supply circuit claimed in claim 10 wherein the drive circuit includes a NPN drive transistor connected at its collector to the base of the output transistor and at its emitter to a ground terminal, a base of the drive transistor being connected to the output of the error signal generator, and a first analog switch connected between the base of the drive transistor and the ground terminal so as to bring the drive transistor in a cut-off condition when the first analog switch is closed.

12. A stabilized power-supply circuit claimed in claim 11 wherein the comparator includes a first input PNP transistor connected at its emitter to the input terminal and at its collector through a diode to the ground terminal, a second input PNP transistor connected at its emitter to the output terminal and at its collector through a first constant current circuit to the ground terminal, and a third PNP transistor connected at its base to the collector of the second input transistor and at its collector to a control input of the first analog switch and through a second constant current circuit to the ground terminal, the bases of the first and second input transistors being connected together through a third constant current circuit to the ground terminal and also through another diode to the input terminal, whereby when the voltage at the input terminal is higher than that at the output terminal, the first input transistor is maintained in ON condition and the second input transistor is in OFF condition so as to put the third transistor in ON condition thereby to bring the first analog switch in OFF condition, and when the voltage at the output terminal is higher than that at the input terminal, the first input transistor is brought into OFF condition and the second input transistor is brought into ON condition so as to put the third transistor in OFF condition thereby to bring the first analog switch in ON condition.

13. A stabilized power-supply circuit claimed in claim 12 wherein the error signal generator includes a differential circuit having one input adapted to be connected to the reference voltage and another input connected to receive a voltage signal representative of the voltage at the output terminal, the differential circuit being connected to the ground terminal through a second analog switch having a control input connected to the collector of the first input transistor, whereby when the voltage at the input terminal is higher than that at the output terminal, the second analog switch is maintained in ON condition so as to hold the differential circuit in an operable condition, and when the voltage at the output terminal is higher than that at the input terminal, the second analog switch is turned off so as to render the differential amplifier inoperable.

14. A stabilized power-supply circuit claimed in claim 13 wherein the second input of the differential circuit is connected to the output terminal through a voltage divider and a third analog switch, which is coupled to the collector of the first input transistor, whereby when the voltage at the input terminal is higher than that at the output terminal, the third analog switch is maintained in ON condition so as to form a feedback path to the second input of the differential circuit, and when the voltage at the output terminal is higher than that at the input terminal, the third analog switch is turned off so as to open the feedback path.

15. A power-supply circuit comprising a voltage input terminal for connection to an electric power source, a voltage output terminal, a feedback circuit connected to the voltage output terminal for generating a feedback voltage, means comparing the feedback voltage with a reference voltage for generating an error signal, an output circuit connected between the voltage input terminal and the voltage output terminal for supplying a stabilized voltage to the voltage output terminal in response to the error signal, means comparing the voltage at the voltage input terminal with the voltage at the voltage output terminal for generating an output signal when the former voltage is lower than the latter voltage, means provided between the voltage output terminal and the feedback circuit and responsive to the output signal to separate the feedback circuit from the voltage output terminal, and means coupled to the output circuit and responsive to the output signal to put the output circuit in an inoperable condition.

16. A stabilized power-supply circuit which includes a reference voltage circuit for generating a reference voltage, a voltage input terminal for connection to an electric power source, a voltage output terminal, a feedback circuit having a resistor connected to the voltage output terminal for generating a feedback voltage, means for comparing the feedback voltage with the reference voltage for generating an error signal, a drive circuit responsive to receiving the error signal, an output circuit connected between the voltage input terminal and the voltage output terminal and driven by the drive circuit to supply a stabilized voltage to the voltage output terminal, wherein the improvement comprises a first switch circuit connected between the voltage output terminal and the feedback circuit, a second switch circuit connected to the error signal generating means, a third switch circuit connected to the drive circuit, and a comparator means connected between the voltage input terminal and the voltage output terminal and having an output connected to respective control inputs of the first, second and third switch circuits.

17. A power-supply circuit as claimed in claim 16 wherein the first, second and third switch circuits are adapted such that when the voltage of the input terminal is not smaller than that of the output terminal, the first switch circuit and the second switch circuit are maintained in ON condition and the third switch circuit is maintained in OFF condition so that the feedback circuit, the error signal generating means and the drive circuit are in an operable condition, and when the voltage of the input terminal is smaller than that of the output terminal, the first switch circuit and the second switch circuit are rendered off and the third switch circuit is rendered on so that the feedback circuit, the error signal generating means and the drive circuit are rendered inoperable.

18. A stabilized power-supply circuit comprising:
an input terminal to be connected to an electric power source,
an output terminal to be connected to a load and an auxiliary power source,
a ground terminal,
a reference voltage circuit for generating a reference voltage,
a differential circuit having one input adapted to be connected to the reference voltage circuit and another input connected to receive a voltage signal representative of the voltage at the output terminal, the differential circuit being connected to the ground terminal through a first analog switch so that when the first analog switch is maintained in ON condition the differential circuit it hold in an operable condition, and when the first analog switch is turned off the differential amplifier is rendered inoperable,
a drive circuit including a NPN drive transistor connected at its emitter to the ground terminal and at its base connected to the output of the differential circuit, and a second analog switch connected between the base of the drive transistor and the ground terminal so as to bring the drive transistor in a cut-off condition when the second analog switch is closed,
a PNP output transistor connected at its base to a collector of the drive transistor, an emitter and a collector of the output transistor being connected to the input terminal and the output terminal, respectively,
a feedback circuit including a resister connected at its on end to the second input of the differential circuit and a third analog switch connected between the other end of the resister and the output terminal,
a comparator which includes a first input PNP transistor connected at its emitter to the input terminal and at its collector to respective control inputs of the first and third analog switches and through a diode to the ground terminal, a second input PNP transistor connected at its emitter to the output terminal and at its collector through a first constant current circuit to the ground terminal, and a third PNP transistor connected at its base to the collector of the second input transistor and at its collector to a control input of the second analog switch and through a second constant current circuit to the ground terminal, the bases of the first and second input transistors being connected together through a third constant current circuit to the ground terminal and also through another diode to the input terminal,
whereby when the voltage at the input terminal is higher than that at the output terminal, the first input transistor is maintained in ON condition and the second input transistor is in OFF condition so as to put the third transistor in ON condition thereby to bring the first to third analog switches in ON condition, and when the voltage at the output terminal is higher than that at the input terminal, the first input transistor is brought into OFF condition and the second input transistor is brought into ON condition so as to put the third transistor in OFF condition thereby to bring the first to third analog switches in OFF condition.

19. A voltage regulator comprising a voltage input terminal for connection to a power source voltage, a voltage output terminal, means for receiving a voltage which is representative of a voltage on the voltage output terminal for comparing the received voltage with a reference voltage so as to generate an error signal, an output circuit connected between the voltage input terminal and the voltage output terminal and responding to the error signal to output a stabilized voltage to the output voltage terminal, and means for monitoring a voltage supplied on the voltage input terminal for disabling the output circuit when the voltage on the voltage input terminal drops, so that the voltage output terminal is electrically isolated from the voltage input terminal.

* * * * *